Oct. 17, 1944.
E. M. KELLY ET AL
2,360,812
PURIFICATION OF LIQUIDS
Filed Sept. 18, 1941
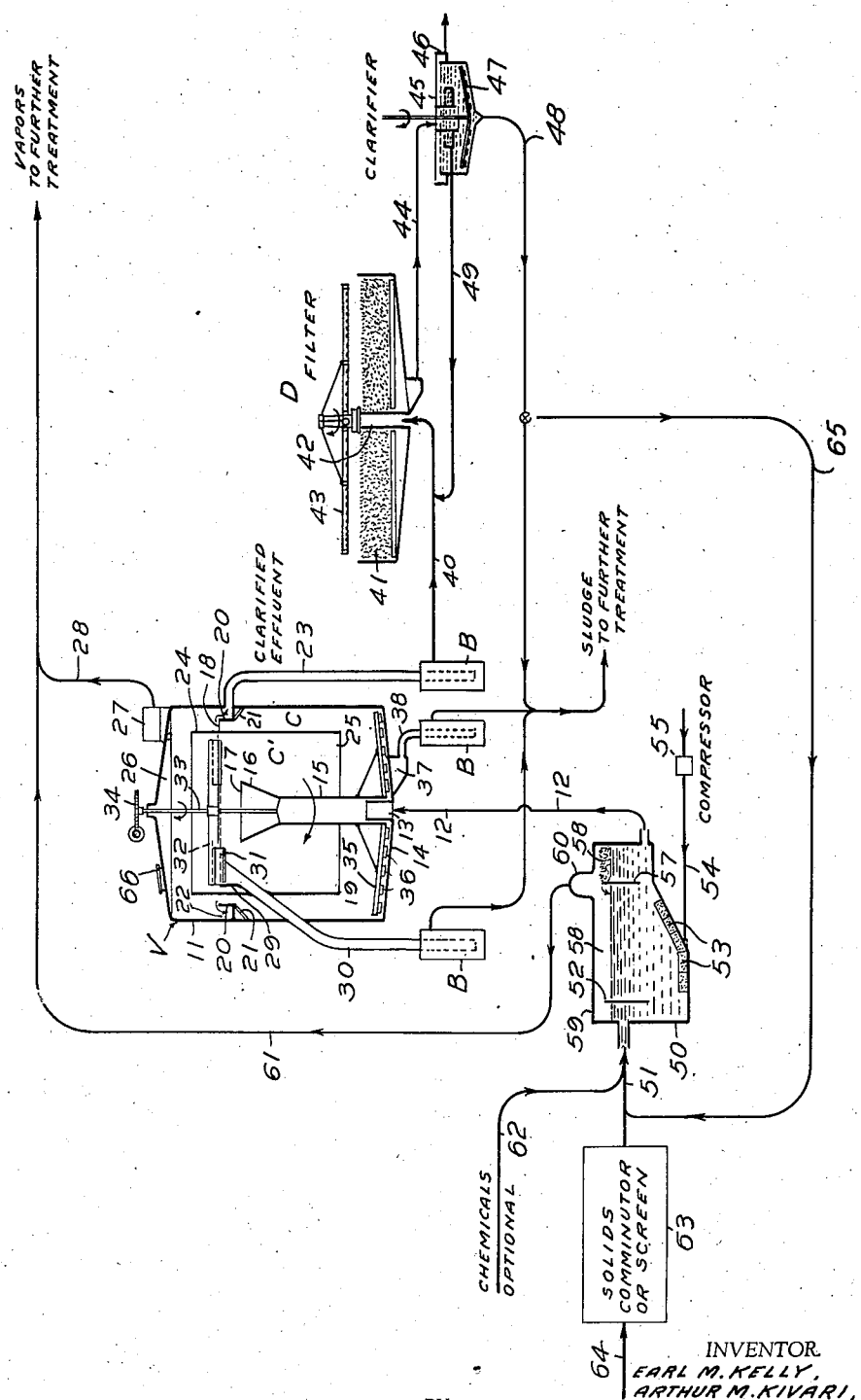
INVENTOR.
EARL M. KELLY,
ARTHUR M. KIVARI,
BY
Arthur Middleton
ATTORNEY.

Patented Oct. 17, 1944

2,360,812

UNITED STATES PATENT OFFICE 2,360,812

PURIFICATION OF LIQUIDS

Earl M. Kelly and Arthur M. Kivari, Los Angeles, Calif., assignors to The Dorr Company, Inc., New York, N. Y., a corporation of Delaware Application September 18, 1941, Serial No. 411,269

2 Claims. (Cl. 210—2)

This invention relates to purification treatment of impure waste liquids having particles in suspension therein and having septical organic matter that requires to have its biochemical oxygen demand lessened, if not satisfied. Such wastes are illustrated by sewage, and wastes from packing houses, canneries, dairies, oil refineries and the like.

Purification of liquids in its broadest sense includes two types of treatment. One by which suspended solids or other particles are separated from their carrying liquid, which is herein called clarification, and the other by which the oxygen demand of the liquid is satisfied, which is herein called purification, that word being thus used in a rather limited or specific sense. A major object of this invention is to carry out both clarification and purification efficiently in apparatus that is highly effective, reasonably cheap to install and equally cheap to operate dependably.

Waste liquids heretofore have been usually subjected to treatment in mechanically cleaned clarifier or apparatus in which suspended solids are settled into the form of sludge in machines that operate as a result of sedimentation. Such machines are effective in so far as settleable solids are concerned but where a liquid has many floatable suspended solids such as particles of turbidity, the floated solids form into a scum that a clarifier is not ordinarily equipped to handle. Accordingly, one of the features of this invention is the use of a machine that is designed not only to handle normally floatable solids but also cause to float certain normally non-floatable solids or suspended particles. Thus, this invention proposes to use on waste liquids a machine which induces the floation of suspended particles by the use of vacuum effects. By the use of such a machine, it is found that polluted waste liquids are clarified of their polluting septical matter in a highly efficient manner, so that the clarified effluent emitted or discharged from such a machine is substantially freed or ridded of its suspended matter.

In the purification of polluted liquids or those having septical organics therein, this invention proposes to use the combination of trickling filter-bed in combination with a mechanically cleaned clarifier in circuit therewith. In such a combination, the biochemical oxygen demand (B. O. D.) can be satisfied or lessened, effectively, but heretofore, such a combination has been called upon to do the work of clarification as well as biologic purification. We have found that if the process of clarification can be well carried out in one station from which is delivered to the combination filter-bed and clarifier a clear effluent even though high in B. O. D., the combination filter-bed and clarifier can do a much better job in that it needs only to do biologic purification work. Thus the use of a vacuum flotation clarification apparatus ahead of a combination trickling filter and clarifier, has a cumulative effect on the latter in a variety of ways.

In the combination filter-bed and clarifier assembly, the biologic organisms of the filter-bed, or at least some of them, feed on the septical organic material of the liquid which they convert, some directly and some indirectly, into a stabilized purified liquid. But in this process some solids are coagulated or agglomerated by the biologic organisms thus leaving some suspended solids in the discharge from the filter-bed. Also as the liquid filtering or percolating through the filter-bed is in effect aerated, the filter-bed discharge usually is emitted from the filter-bed in a condition wherein it has some floating solids and some air. This condition is not well handled in an ordinary clarifier, but if this liquid, after having its normally settleable solids sedimented therefrom, is carried back and treated in the vacuum flotation machine, the air and floatable solids are removed therefrom in that machine, which results in considerable advantage. By the elimination of practically all of the suspended solids in the liquid prior to its reaching the trickling filter-clarifier combination, the latter can be made smaller and thus decrease the installed cost thereof as well as operation costs. Less ground space is thus required. Less ground space is also needed for the vacuum flotation machine as compared with the usual clarifier, and as the vacuum flotation machine is covered, it makes a more sightly apparatus in that the odorous scum is maintained out of sight, and obnoxious odors are prevented from escaping into the surrounding atmosphere.

In the usual trickling filter-bed, there is a tendency of suspended solids to clog the interstices between the discrete filter-bed media. Clogging of the bed can cause it to pond or become flooded and thus submerged, a condition which if it persists causes the biologic organisms to starve for want of air. By removing substantially all suspended matter from the liquid passing to the filter-bed, this trouble is assuredly avoided. With the avoidance of threat of ponding, liquid can be supplied to the filter-bed at greater rates, so a bottle-neck is thus overcome for the capacity of the filter-bed in this new arrangement is not dependent upon keeping it in non-ponding condition. Its effective capacity is solely the rate at which it can purify liquid passed therethrough. If polluted liquid be passed through a trickling filter-bed only, the stability of the degree of purity of the discharged liquid is not necessarily constant. Indeed, the B. O. D. of such liquid usually reverts or increases with the passing of time. But the purity of the emitted liquid can be substantially stabilized or fixed if the filter-bed be placed in a circuit with a clarifying tank whereby liquid being treated flows from one to the other and back again, more or less in closed circuit and in a manner whereby new liquid can be fed to the circuit while treated liquid is released from the circuit. The time of detention in the circuit of the liquid being treated controls the degree of stabilization of the released effluent. Thus this invention proposes to use such a circuit for the purification station and preceding that station is a vacuum flotation clarification station.

The vacuum flotation station is characterized in that it comprises a closed tank adapted to hold gas-containing liquid being treated, suction means for applying the effect of vacuum to the surface of the tank liquid, scum-receiving and discharging means extending into the tank adjacent the liquid level thereof, scum-impelling means associated with the scum means, clarified effluent discharge means, means for impelling freed liquid into the tank to the liquid level thereof, means for releasing or discharging clarified liquid from the apparatus, and means for discouraging air leakage into the tank through said discharges. Details of construction and operation of such a machine are given hereinafter.

The trickling filter-clarifier assembly for use in the practice of this invention is characterized in that it comprises a filter-bed of discrete filter media such as rubble or cinders to the surface of which liquid is applied by means of rotating arms that spray therefrom liquid to be treated in the bed. On the media of the bed, there are maintained active aerobic biologic organisms ranging from bacterial flora up through worms and crustaceans. Piping is arranged to a flow-path between the filter-bed and a mechanically cleaned clarifier or sedimentation tank. And piping is also arranged to provide a flow-path between the tank to the inflowing feed for the filter-bed. This permits a complete cyclic flow between filter-bed and clarifier. Feed means are provided for the circuit and effluent release means are also provided for the circuit. The clarifier or sedimentation tank of this circuit can be made smaller than otherwise if the liquid passing through the piping from the clarifier to the filter-bed is withdrawn directly from the liquid contents of the clarifier rather than being withdrawn from the effluent that has left the clarifier. The reason for this is that since the degree of stabilization of the purity of the effluent leaving the clarifier at the circuit is dependent upon the time of detention of the liquid in the circuit, by recirculating liquid while it is within the circuit before it is released therefrom, the recirculating liquid comprises all that which is in the circuit including that which is in the filter-bed and the clarifier. In other words, by this means there can be a high circulating load in the circuit, whereas if the clarifier effluent were being circulated, then the clarifier would be two or more times larger than it would be otherwise in order to get the same detention period.

The best embodiment of this invention now known is chosen for the purpose of illustration herein. It is shown diagrammatically or symbolically herein with only enough detail shown for an understanding thereof. The showing is not mechanically complete because single lines have been used wherever possible and especially for piping and no attempt has been made to show the presence of pumps or valves since it is believed obvious to use them wherever needed.

The embodiment illustrated is not to be taken as limited because the invention is capable of being practiced with modified forms of apparatus within scope of the appended claims.

Therefore, in the accompanying drawing only one figure has been shown which illustrates diagrammatically one embodiment of this invention since this invention relates to the combination of a type of vacuum flotation machine in cooperative arrangement and which acts conjointly with the circuit which includes a filter-bed and a clarifier to produce new technical effects. The vacuum flotation apparatus will be described first and thereafter the filter-bed clarifier combination will be described.

The vacuum flotation apparatus suitable for practicing this invention is more completely described in a co-pending patent application of Packard and Clemens, filed September 17, 1941, Serial No. 411,110. However, it is believed that sufficient understanding of the type of vacuum flotation apparatus suitable for use in practicing this invention can be gleaned from the following description:

Reference numerals have been used. They have been applied to illustrate parts as follows:

The letter V is used to indicate generally the vacuum flotation apparatus which comprises a gas-tight closed tank 11 to which gas-containing liquid 12 is fed to the tank through an opening 13 in the bottom 14 thereof and passes upwardly through a draft tube 15 upstanding in the tank that terminates in a flared portion 16 having a mouth 17 from which feed liquid is emitted into the tank in a region adjacent the liquid level 18 therein. The liquid level of the encased body of liquid 19 in the tank is maintained or controlled in the embodiment shown by means of an overflow weir 20 suitably supported in the tank by means such as brackets 21. Liquid overflowing the weir 20 passes into a launder 22 from which it flows or is removed from the tank by means of clarified effluent discharge pipe 23. 24 represents a baffle preferably annular that extends into the liquid body 19 to a region 25 thereof in which there is a minimum of suspended solids. Above the liquid level 18 in the tank is a gas-receiving and collecting space 26. 27 represents a suction of vacuum pump capable of producing on the liquid in the tank the effect of vacuum. 28 indicates a pipe passing through the pump 27 through which gases sucked by the pump are exhausted or passed to discharge.

Associated with the liquid body 19 adjacent the liquid level 18 thereof and disposed effectively within the liquid encircled by the baffle 24, is a scum-receiving and discharge hopper 29 connected to a pipe 30 that is a scum discharge means. At one side of the upper terminal of the hopper 29 is a partially submerged ramp 31 up which floating scum is swept to be deposited into the hopper 29 by means of rotating scum arms 32, rotated from shaft 33 that is motivated by motor driven gears 34. The shaft 33 may also rotate the draft tube 15 with sludge impelling arms 35 and blades 36 adapted to impel sediment or sludge over the bottom 14 of the tank into sludge hopper 37 from which sludge is discharged through pipe 38. Effluent discharge pipe 23, scum discharge pipe 30, and sludge discharge pipe 38 each has associated with it a barometric leg arrangement marked "B" to prevent substantial air leakage through it into the tank 11. The draft tube 15 thus emits or releases influent feed liquid adjacent the liquid level 18 of that part of the liquid that is surrounded by the baffle 24. Floating scum is removed from the same region in that the rotating arms 32 sweep scum floating on the liquid encircled by the baffle 24 to and into the hopper 29 for discharge. However, clarified effluent leaves the liquid body 19 by overflow weir 20 into launder 22 in a region that is functionally remote from that in which feed liquid is released from the mouth 17 of the flared portion 16 of the draft tube 15 because the clarified effluent is drawn from the liquid body 19 in effect from a region indicated by the lower edge 25 of the baffle 24. The weir 20 thus controls the liquid level 18 in the tank since the baffle 24 divides the liquid body of the tank in the two balancing columns of which one between the baffle 24 and the weir is a column C of clarified liquid which balances the other column C' that is encircled by the baffle 24 and comprises liquid being clarified, plus floating scum. The column within the baffle 24 is somewhat taller than the column of clarified liquid because it includes floating scum.

Scum passing from the barometric leg on scum discharge pipe 30 and sediment discharging from the barometric leg on sludge discharge pipe 30 can join and be passed to further treatment of disposal. Clarified effluent C passing from the barometric leg on the effluent pipe 23 is conveyed through pipe 40 to a circuit indicated generally by D that comprises a trickling filter-bed 41 made up of filter material or media of discrete particles such as stone or cinders. In such a bed it is usual to supply feed liquid thereto through a hollow column 42 from whence the liquid is distributed over the surface of the bed by being emitted through rotating radial arms 43. The arms are rotated usually by the reaction of liquid leaving the trailing side of the arms through nozzle-like orifices. Liquid that percolates through the stone in the bed 41 comprises filter-bed discharge and is passed through pipe 44 to a sedimentation tank 45 having an overflow discharge 46. The tank may be equipped with a cleaning mechanism for impelling sediment or sludge to discharge through pipe 48. This discharge sediment may also join the sediment or sludge from scum outlet pipe 30 and sludge outlet pipe 38 of the vacuum apparatus V. The pipe 44 thus provides a flow-path for filter-bed discharge passing from the filter bed 41 to the clarifier 45. Another flow-path is provided in pipe 49 through which liquid may pass to the filter-bed feed pipe 40 to be mixed with feed incoming to the filter-bed whereby the filter-bed is thus continually supplied with a mixture of new feed and liquid recirculated from the clarifier 45. The pipe 49 preferably is arranged to conduct to the filter-bed 41 liquid that is taken directly from the liquid contents of the clarifier 45 for reasons given herein elsewhere.

Liquid fed for treatment in the vacuum flotation apparatus V should be gas-containing. Under some conditions liquid to be treated has sufficient gas to produce the flotation effects desired under the influence of vacuum, but usually it does not. In such a case the liquid must have gas diffused therein in a gassing station. Such a station is indicated by tank or basin 50 to which impure liquid is supplied through pipe 51. The basin is provided with a baffle 52 for preventing short-circuiting of the feed liquid. In the basin 50 means are provided for diffusing gas in the liquid. Such means can be an impeller agitator for pumping gas or air into the liquid quickly and violently as shown, for instance, in the patent application of Kelly et al., Serial No. 399,058 and filed June 21, 1941. This type is to be recommended where a high degree of solids removal is desired. However, it may be desired when treating sewage and the like, to substitute for the more efficient short violent gassing of the liquid, a gentle and prolonged gas-diffusing action by means of placing in the basin 50 porous tiles or plates 53 to which is pumped through pipes or manifolds 54 compressed air or gas compressor 55. The compressed air is carbonated in tiny bubbles which become entrained in the impure liquid in a highly satisfactory manner. Some of the bubbles grow to be large, so it is important that they be removed from the liquid, and this can be done by passing the gassed liquid to a de-gassing or de-aerated chamber or zone associated with the basin 50 which is in effect a zone of relative quiescence from which agitation of the liquid in the basin 50 is barred by a baffle 57. The larger bubbles of gas and some scum 58 which inevitably collect here overflow the baffle 57 back into the main body of the basin 50 where they are diffused into the liquid. The gas or foul vapors that escape from the tank are collected in a gas space 58 beneath the top 59 of the basin from whence they flow to gas dome 60 and through pipe 61 to discharge or for further treatment. Gassed and de-gassed liquid then flow from the basin 50 through pipe 12 to the vacuum flotation machine V. Air may be used for the gas-diffusing action on some liquids but when treating sewage and other liquids having a relatively high biologic oxygen demand, air is used to satisfy this demand rather than to aerate. So when such liquids are to be gassed, it is preferable to gas them with the gas that is relatively inert to the oxygen demand and such gasses are illustrated by carbon dioxide and nitrogen or a combination thereof that may include some air. Since this invention has as one of its objects the satisfying B. O. D. of the liquid treated the satisfying of that B. O. D. to some degree in a gassing station relieves to that extent the load of B. O. D. satisfaction that would otherwise fall on a trickling filter circuit D.

Some liquids such as sewage have suspended particles, especially particles of turbidity, namely, those that are colloidal that are difficult of sedimentation unless flocculated. Flocculation of these particles can be facilitated if chemicals are added to the sewage such as at 62 prior to their entry into the gassing basin 50. These chemicals such as alum or ferric chloride tend to coagulate the flocculatable particles and flocculation is further due to the agitation encountered by the liquid in the gassing zone or basin 50. Since another function of the trickling filter is to coagulate colloidal material, that load ordinarily on a trickling filter is lessened to the extent that flocculation takes place in the basin 50 because flocculated particles are removed from their liquid in the vacuum apparatus V and therein are eliminated prior to their reaching the filter circuit D. Since the gassing station 50 of the vacuum apparatus V is designed to handle suspended solids of too large a size, it is desirable to treat the large solids usually found in sewage, or cannery wastes and the like, by either screening them out or comminuting them to a size that can be handled by a subsequent sewage apparatus therefor. 63 indicates a station where this comminuting takes place. 64 indicates the incoming raw sewage or other waste liquid to be treated. The sediment discharging from the clarifier 45 through the pipe 48 may well have in it certain gas or vacuum floatable solids, so optionally some at least of that sediment may be conducted through pipe 65 back to be mingled with the liquid flowing to the vacuum apparatus V for treatment therein and preferably back to the conduit 51 in advance of point such as 62 where chemicals possibly are being added.

The operation of this clarification and purification system is as follows: gas-containing impure liquid that is to be treated to remove therefrom suspended particles and to satisfy or reduce the biochemical oxygen demand of the liquid with possibly to stabilize the reduced biochemical oxygen demand against reversion, is supplied to the vacuum flotation apparatus V through draft-tube 15 up which the liquid flows due to the effect of vacuum produced in the tank 11 by means of suction or vacuum pump 27. The feed is emitted or released into the body of liquid 19 already in the tank, substantially adjacent to the liquid level 18 which by means of overflow weir means 20 is controlled or maintained, since the height of this weir establishes the general liquid level of the liquid in the tank 11. As soon as the liquid is emitted from the flaring upper terminal 17 of the draft-tube 15 (if not somewhat sooner) the effect of vacuum in the tank operates to float and to accumulate as scum not only those suspended particles of the feed that are normally floatable but many that are not normally floatable. The floating scum, or float, is swept along the liquid level by the rotating scum sweeping or impelling arms 32 until it encounters the ramp 31 up which the scum is impelled to and into the scum hopper 29 from whence it flows down pipe 30, through the barometric leg B on that pipe, to discharge or for further treatment. It is to be noted that the scum is thus removed approximately from its place of formation and also in the region of the feed release, a region that is encircled by the substantially annular baffle 24. This baffle extends into the liquid body 19 in the tank to a point of termination that is in the region where there is a minimum of suspended solids in the liquid since its lower termination comprises the region from which claried effluent is in effect drawn from the tank 11 through the column C of clarified liquid that overflows weir 20 into launder 22 from whence it is removed from the tank through effluent pipe 23 and its barometric leg B. The point of termination of this baffle 24 is determined somewhat by the degree of vacuum on the tank. Vacuum equivalent of from seven to nine inches of mercury has been found to operate satisfactorily, so the pump 27 is operated accordingly. At that rate, the effluent should be taken off from the liquid body 19 in the tank at a submerged point at which the effect of vacuum corresponds approximately to about only five inches of mercury. The dimensions of a satisfactory tank have been found to have a liquid depth of about 10 feet and three inches in which case the baffle 24 should terminate at 25 about five feet from the tank bottom 14. Another function of the baffle 24 is to serve as a dividing means between column C of clarified liquid and column C' of liquid being treated plus its floating scum. These are columns that balance each other. The effluent take-off over the weir 20 is thus from a region that is functionally remote from the place where the incoming feed liquid is emitted into the tank. It is also functionally remote from the place of discharge of the floating scum. Thus by-passing is prevented. In such a vacuum flotation apparatus about 40% of the suspended solids in the feed liquid is removed from the tank as scum. Certain solids in the feed liquid are not floatable even under the effect of vacuum, so they settle onto the floor 14 of the tank where they form into sediment or sludge from whence they are impelled by rotating sludge impelling blades 36 on arms 35 into sludge sump 37 from whence in turn the sludge can be discharged through pipe 38 through its barometric leg B to discharge or to further treatment. The detention time required for liquid in the vacuum flotation tank V is from three to seven minutes, and clarified liquid can be discharged from the tank at rates ranging from 5,000 to 10,000 gallons per 24 hours per square foot of liquid level surface in the tank. The rate overflowed depends upon the degree of clarification required of the effluent. For instance, in treating cannery wastes, it may be desirable to go appreciably below 5,000 gallons, so this and the upper quantity of 10,000 gallons are not our extreme limits.

The vacuum apparatus removes from 40–80% and upwards of the suspended solids of the liquid treated thereby, so effluent emitted from the vacuum flotation apparatus V is substantially ridded of suspended solids. However, it still may have a relatively high biochemical oxygen demand. Such effluent is then passed through pipe 40 to a circuit D in which the biochemical oxygen demand is satisfied or at least lessened. The vacuum flotation treated effluent passes through pipe 40 to be applied and distributed over the surface of the filter-bed 41 from whence it percolates through the discrete material of the bed meanwhile being subjected to the action of aerobic biologic organisms whose major function in this bed is to reduce the biochemical oxygen demand of the liquid transmitting the bed in a downward direction. Liquid that has thus been subjected to biologic action passes from the filter-bed as discharge and is flowed through pipe 44 to a clarifier or sedimentation tank 45. Herein the liquid is detained in quiescent sedimentation so that suspended solids therein can settle to the floor of the clarifier in the form of sludge or sediment. Such sediment is impelled to discharge by sludge impelling rakes 47 and passes through pipe 48 to further treatment.

The biologic organisms in the filter-bed 41 have at least two effects, of which one is to satisfy or reduce the oxygen demand of liquid that they encounter and the other is to coagulate or agglomerate suspended solids. In any ordinary or usual trickling filter-bed both of these functions are made use of but it has been found that substantially in proportion as they are not required to coagulate suspended solids, their efficiency in reducing oxygen demand is increased. Therefore, it is a teaching of this invention to relieve them as much as possible of their solids coagulating acting by doing that for them in the treatment of the impure liquid before it reaches the filter-bed, namely doing it in the vacuum flotation apparatus V. But however much the solids coagulating is done for them in advance, there are always some solids that they succeed in coagulating, and it is these unavoidably coagulated solids that are to be caught and sedimented in the clarifier 46. However, the clarifier 46 has a further and much more important function, namely as a supplemental place where active biologic organisms are maintained and wherein they do oxygen satisfying work. The organisms incubate readily and grow in the filter-bed but due to the more or less rapid flow of liquid through the bed, such organisms are washed or swept therefrom into the clarifier where they live, work, and thrive. They thrive because the filter-bed has an aerating effect on the liquid passing therethrough so that it contains a substantial quantity of dissolved oxygen, which is an environment conducive to continued activity of the organisms. Therefore, if the liquid normally flowing to the filter-bed is augmented in volume with liquid continually recirculated through pipe 49 to a point ahead of the filter-bed from the clarifier, the filter-bed is dosed with liquid at a rate sufficiently high to wash living organisms into the clarifier and sufficiently high to carry with the liquid entrained oxygen into the clarifier. Thus, by this arrangement, the filter-bed can be made smaller than usual because some of its oxygen satisfying capability is transferred to the clarifier. Thus in the circuit D made up of a filter-bed and a clarifier, there is a high circulating liquid load, in which as well as in the filter-bed and clarifier, oxygen satisfaction is continually taking place.

The circuit has another function, namely of stabilizing the degree of oxygen satisfaction of the effluent therefrom, for trickling filter-bed effluent may be reasonably purified when released, but it has the unhappy faculty of being non-stable in that its oxygen demand will increase again progressively within a few days. In order to overcome this tendency and thus make the oxygen satisfaction more or less permanent and thus stabilized, it has been found that this stabilization is a function of the time of detention of the liquid within the circuit D. The time of detention should be of the order of two hours, although the time depends upon the degree of stability required. For total stability (for 15 days or more) with substantially no oxygen demand, a total of six hours detention should be given, but as sanitary engineering requirements are usually less than that, the degree obtained is proportionate to the proportion of six hours detention that is made use of. If liquid to be recirculated to the filter-bed for augmenting its feed, were drawn from the clarifier effluent, the clarifier would have to be of a certain size to assure the required detention period, but if the withdrawn liquid for recirculation be withdrawn directly from the contents within the clarifier prior to its passing over any weir or prior to its release, the clarifier can be considerably smaller for it permits the entire volumetric capacity of the circuit to be calculated into the detention time. Moreover, the life cycle of the majority of the bacteria made use of is only twenty minutes; the faster they are recirculated, the more effective is the use that can be made of their life processes. Again, as these bacteria have no power of movement, they must have feed brought to them and their excrescences must be swept from them, both of which objectives are accomplished when they are moved about rapidly as they are by this recirculation. Clarified and purified stabilized effluent is released from the circuit D preferably from the clarifier at 46. The foregoing technical effects can be attained irrespective of the sequence of the trickling filter-bed and the clarifier in the circuit D, so the clarifier could come first and receive clarified effluent from the vacuum machine V, with the filter-bed coming next in the circuit, instead of the sequence shown. However, the sequence shown is the preferred one.

In the embodiment shown, the feed of impure liquid, prior to its introduction into the vacuum apparatus V is subjected to an aerating or gassing operation followed by a de-aerating or degassing operation. This is carried out in the station illustrated by basin 50 wherein air or gas is bubbled through the liquid to bring about as high an entrainment as possible in the liquid of minute bubbles. The smaller the better. Indeed, bubbles of microscopic size are best or most effective in aiding in the subsequent vacuum flotation of the suspended solids or other floatable particles. This can be done preferably by passing gas compressed in compressor 55 through porous tiles or plates 53 in the basin bottom for these tiles tend to emit bubbles of very small size. Thereafter the gassed liquid passing into the degassing compartment 56 where bubbles larger than the small ones are permitted to break or to rise along with scum at 58 from whence they overflow weir 57 back into basin 50 where they are broken up and dispersed due to the agitation therein. The liquid passing to the vacuum apparatus V should have enough air or gas therein, so to that end it has been found that gas should be supplied thereto at the rate of from 0.02 to 0.05 cubic feet per gallon of liquid based upon average flow, depending upon the flotation conditions to be encountered, and in order to be sure that this amount of gas is entrained in the liquid, the liquid should be detained in the gassing station or basin 50 for a period of from 5 to 20 minutes depending upon the rate at which gas is being supplied thereto.

When it is desired to flocculate suspended solids in the gassing zone 50, coagulating chemicals can be supplied to and mixed with the liquid in some chemical feeding station as at 62 whereupon they produce their coagulating effect which is emphasized as flocculation under the influence of the gentle agitation in the basin 50. These flocs are fragile and should not be broken up, so that if flocculation is to be made use of gentle agitation in the basin 50 should be used, in which case the aeration or gassing by the use of porous tiles is recommended, and the longer detention period should be used. But if for any reason flocculation is not needed, and no chemicals are to be used, a mechanical impeller aerator can be substituted for the more gentle and prolonged aerating by means of the porous tiles or plates. In this event, no compressor 55 is needed. However, the use of chemicals and flocculation is to be recommended because this aids in the removal in the vacuum apparatus V of fine solids and especially colloids which otherwise would pass from the vacuum apparatus in its clarified effluent, and their presence would place a burden of coagulation on the biologic organisms in the filter-bed circuit D that it is one object of this invention to discourage. Solids in the influent waste liquid that are larger than can be conveniently handled by the apparatus of this invention are treated in station 63 either (1) to remove them completely as by screening, or (2) by comminuting them into a size that can be handled. Foul vapors accumulated from the liquid in the gassing station 50 can be conducted through gas dome 60 and pipe 61 to a place of disposal, to which pipe 60 can be joined pipe 28 that conveys exhaust gases, and further foul vapors from the vacuum pump 27.

Some of the technical effects attained by the use of this invention are: when treating wastes and particularly cannery wastes, in a trickling filter-bed heretofore by usual methods, floating particles or material have not been eliminated from the liquid passing for treatment in the filter-bed, and this material has tended to clog the bed to its detriment. This has been a problem that to date has not been solved, but it is solved nicely by the vacuum flotation treatment ahead of the filter-bed. The biologic organisms are relieved of their usual solids coagulating duty and thus it has been found that they can function more efficiently by being left solely to satisfy oxygen demand. And by assurance of absence of clogging, the capacity of the filter-bed can be increased, or its size decreased which is the same thing. The solids coagulating function of the organisms for colloidal material is not even necessary, in the practice of this invention, for that material is coagulated and flocculated in the gassing station so that it is substantially removed in the vacuum apparatus. Floatable and colloidal material in the sludge discharged from the clarifier that is in the filter-bed circuit that has heretofore been a problem, can be disposed of by retreating that material in the vacuum flotation apparatus. A trickling filter-bed has been heretofore odoriferous, whereas by the practice of this invention the foul odors or vapors are substantially eliminated from the waste liquid before it reaches the filter-bed circuit. Less ground space is required by the vacuum flotation apparatus than any known pretreatment apparatus for trickling filters, and the filter-bed circuit of this invention also requires less ground space because it can be made abnormally small. Scum is substantially eliminated from the surface of the clarifier in the filter-bed circuit, and scum in the vacuum apparatus is maintained out of sight in that the vacuum tank is enclosed. The entire apparatus is suitable for continuous operation, and is substantially foolproof, so that highly skilled operators are not needed. Less total metal is required in such a plant, which is an important item in the defense program, especially when so many sewage treatment plants are being required for military camps and stations.

We claim:

1. The process for the treatment of waste liquids having oxygen-demanding liquid and suspended constituents including those particles of turbidity inhibitory to aerobic bacterial action, which comprises substantially ridding such liquid of such constituents by establishing and maintaining an encased ever-changing body of such liquid suspension having an overlying gas-holding space, controlling the liquid level of such body, maintaining the liquid level of the body at sub-atmospheric pressure by applying suction equal to more than 6 inches of mercury to gas of said gas-holding space and thereby to said level, continually projecting gas-bearing impure feed liquid and its suspended constituents to adjacent the liquid level of the body and into the reach of the suction used which is sufficient that such constituents are both buoyed and sucked to as well as held at the liquid level collecting as scum, continually removing from a region in the body functionally remote from the scum a clarified oxygen-demanding liquid from which such scum constituents have been substantially so removed, continually removing scum from the body; and thereafter continually passing effluent freed of a significant quantity of its turbidity to purification treatment in a biologic trickling filter-bed circuit wherein there is maintained a mass of active aerobic bacterial organisms and a body of liquid undergoing sedimentation, subjecting such effluent in said circuit to biologic action of said organisms, and removing from the circuit end products.

2. A system for the treatment of impure liquid which comprises a clarifying section including a tank for holding an ever-changing body of liquid while providing a gas-holding space overlying the liquid, means for controlling the level of liquid therein, means for applying suction equal to more than 6 inches of mercury to said gas-holding space and thereby to the liquid level to maintain on said level sub-atmospheric pressure, means for continually projecting gas-bearing impure feed liquid having oxygen-demanding liquid and suspended constituents including particles of turbidity inhibitory to aerobic bacterial action to adjacent such liquid level and into the reach of the suction used which is sufficient that such constituents are sucked to as well as both buoyed and held at the liquid level as floating scum, means for continually removing from a region in the body shielded from the scum a clarified oxygen-demanding liquid from which such scum constituents have been substantially so removed, means for removing such scum from the body; and in combination with the foregoing a purifying section including circuit-providing means comprising an aerobic biologic trickling filter-bed, a sedimentation tank, piping providing a flowpath for filter-bed discharge to the sedimentation tank, and piping providing a flow path for liquid derived from the sedimentation tank to the filter bed, means for supplying such suction-treated clarified oxygen-demanding liquid rid of a significant quantity of its inhibitory constituents to said circuit derived from a region in said tank functionally remote from said scum, and means for removing from said circuit the end products.

EARL M. KELLY.
ARTHUR M. KIVARI.